Aug. 19, 1969

W. K. PRIESE 3,462,120

BALL VALVE

Filed June 27, 1966

INVENTOR.
Werner K. Priese

By Olson, Trexler, Wolters & Bushnell
attys

Aug. 19, 1969  W. K. PRIESE  3,462,120
BALL VALVE
Filed June 27, 1966  2 Sheets-Sheet 2
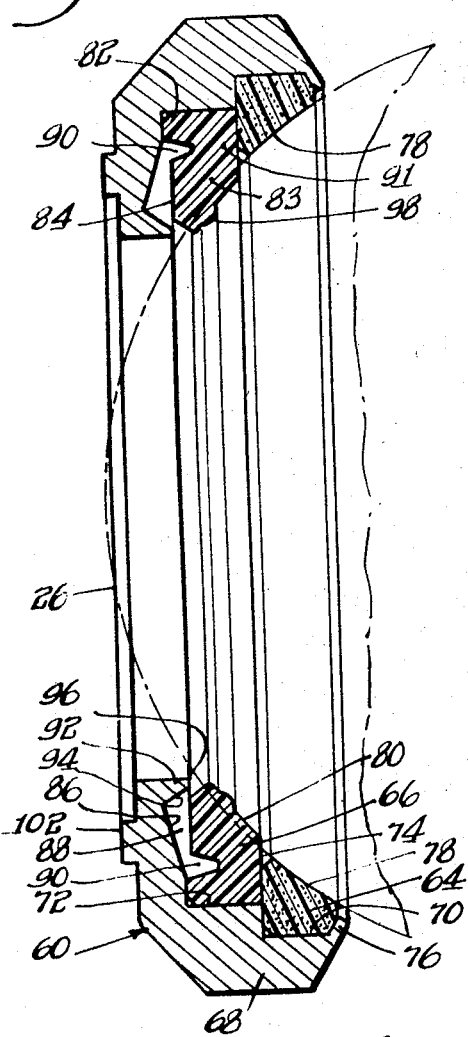
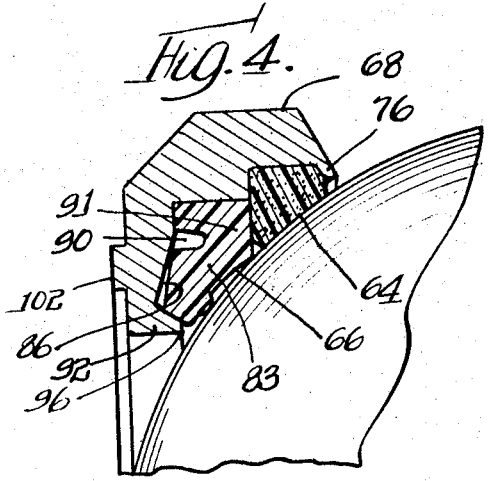
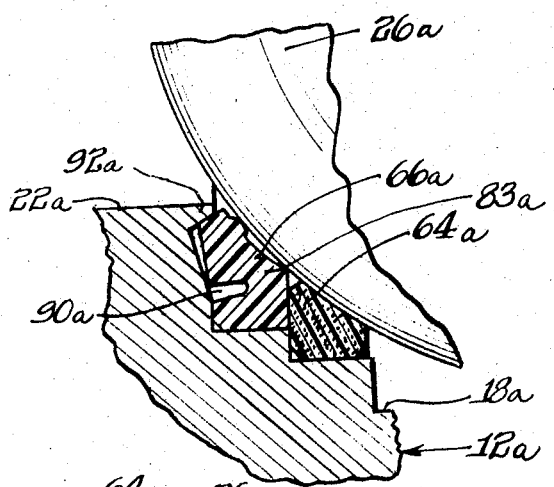
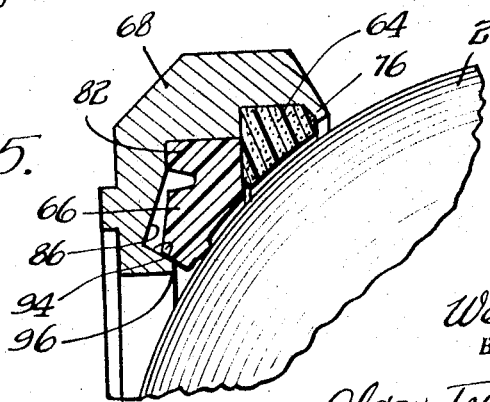
INVENTOR.
Werner K. Priese
BY
Olson, Trexler, Wolters & Bushnell
Attys

United States Patent Office 3,462,120
Patented Aug. 19, 1969

3,462,120
BALL VALVE
Werner K. Priese, Barrington, Ill., assignor to Hills-Mc-Canna Company, Carpentersville, Ill., a corporation of Illinois
Filed June 27, 1966, Ser. No. 560,566
Int. Cl. F16k 5/06, 27/06, 31/60
U.S. Cl. 251—315                                    10 Claims

ABSTRACT OF THE DISCLOSURE

A ball valve is constructed with pairs of cooperating seat rings for supporting and gasketing the flow control ball. A relatively larger diameter, inboard seat ring is formed of a material having a relatively high modulus of elasticity; and the cooperating, relatively outboard ring is fashioned with a lesser diameter to establish the relative inboard-outboard relationship and is fabricated of a material having a relatively low modulus of elasticity.

---

The present invention relates to ball valves.

One object of the invention is to provide a ball valve having a new and improved construction which affords enhanced functional capabilities which are particularly advantageous in high pressure service.

Another object is to provide a ball valve in which an improved and highly advantageous sealing of the valve ball is achieved by means of an improved valve seat structure which seals the valve ball by means of seats formed of yieldable polymeric materials and having the capability of sustaining without damage the full force of high pressure fluid acting on the ball to urge the ball toward the low pressure side of the valve.

Another object is to provide an improved ball valve suitable for high pressure service which affords at once the advantages of a "floating" ball that is urged against the valve seat at the low pressure side of the valve by the force of fluid pressure on the ball and the advantages of yieldable polymeric valve seats which directly engage and seal against the valve ball.

Another object is to provide a ball valve in which the valve ball is supported against the force of fluid pressure on the ball only by valve seat means having an improved construction which enables valve seats, constructed of elastic or yieldable materials and having an inherent capability of maintaining a tight seal against the escape of fluid past the ball, to withstand the full force of high fluid pressure on the ball over a long service life without destroying the effectiveness of the seal between the ball and the valve seats.

Another object is to provide a ball valve in which yieldable polymeric materials are used to great advantage in forming valve seats having extremely effective ball sealing capabilities and a service life which is materially extended by virtue of structural improvements in the valve.

Another object is to provide an improved ball valve of the character recited in the preceding objects which serves to effectively block the flow of fluid through the valve even in the event of destruction by excessive heat of the seats which normally serve to form a seal against the passage of fluid past the valve ball.

Another object is to provide an improved valve of the character recited in the preceding objects which is inherently well suited for economical manufacture.

Another object is to provide an improved ball valve that is made easy to service by virtue of readily replaceable valve seat assemblies which in use afford advantages of the character recited in the preceding objects.

Another object is to provide novel valve seat assemblies for use in valves of the character recited in the preceding objects.

Other objects and advantages will become apparent from the following description of the exemplary form of the invention illustrated in the drawings, in which:

FIG. 3 is a transverse sectional view on an enlarged scale of a valve seat assembly used in the valve of FIGS. 1 and 2, components of the assembly being shown in the positions they occupy before pressure is applied by the valve ball which is illustrated in this figure in broken outline;

FIG. 4 is a fragmentary view similar to FIG. 3 but showing the valve ball in solid lines and showing components of the assembly in the positions they occupy after engagement of the assembly by the valve ball;

Figure 1:
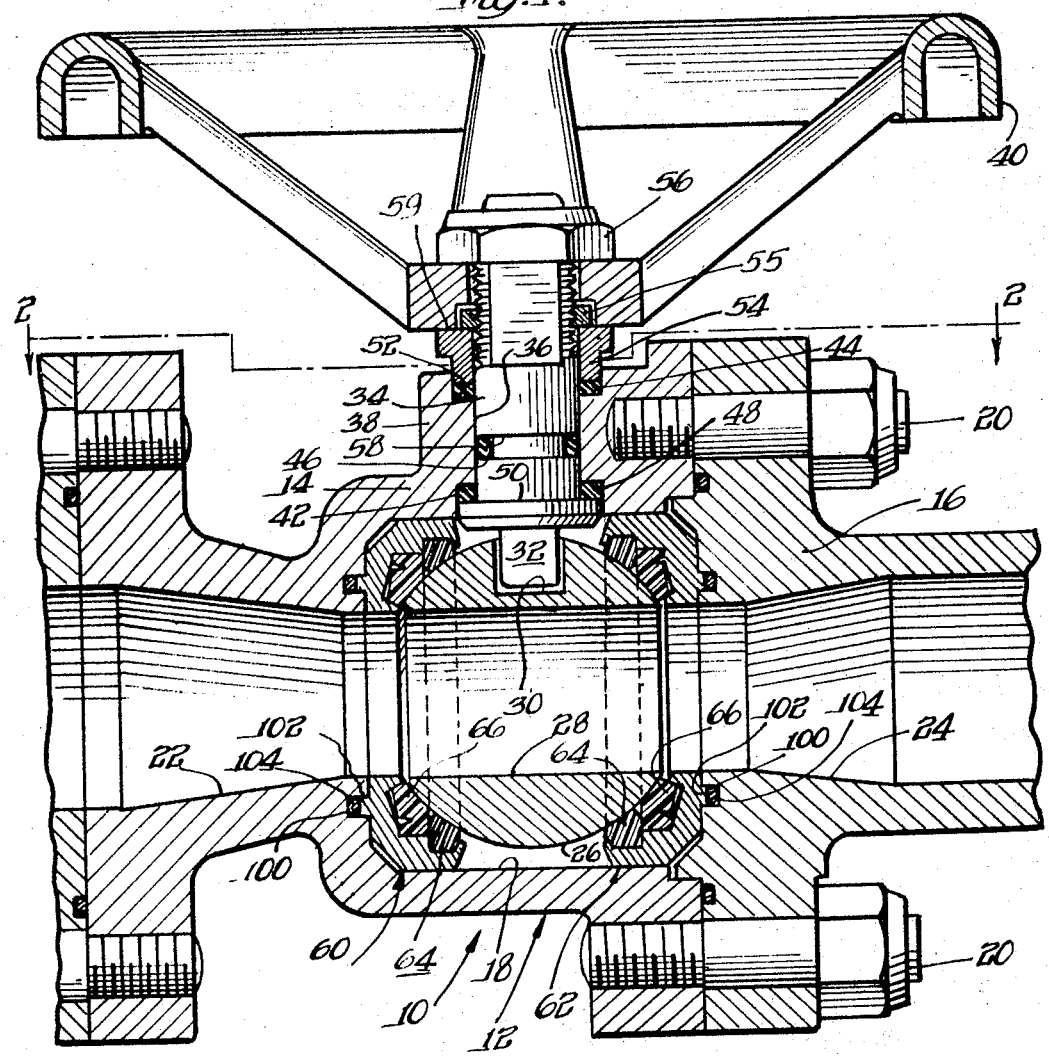
FIG. 1 is a longitudinal sectional view of a valve forming the exemplary embodiment of the invention illustrated, being an enlarged view taken along the line 1—1 of FIG. 2.
Figure 2:
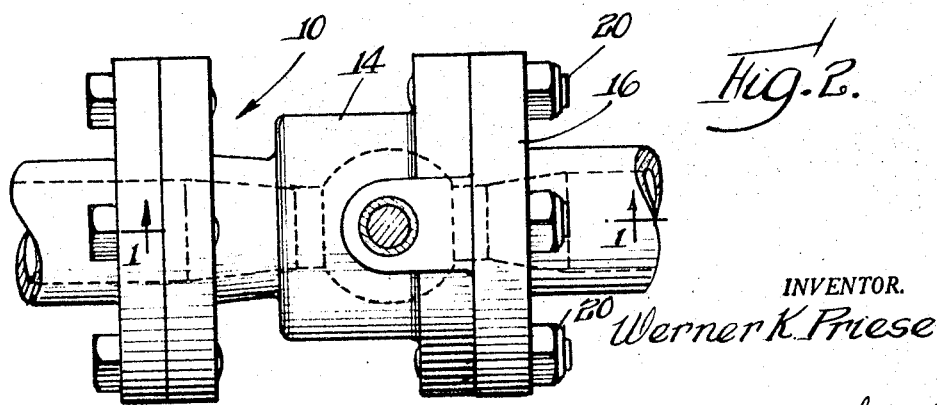
FIG. 2 is a horizontal sectional view on a reduced scale of the valve, being taken along the line 2—2 of FIG. 1.

FIG. 5 is a fragmentary transverse sectional view of a valve seat assembly and the valve ball illustrating the relationship of the parts when the valve assembly is located on the high pressure side of the valve and the ball is closed against high fluid pressure supplied to the valve; and FIG. 6 is a fragmentary transverse sectional view similar to the showing of FIG. 4 but illustrating a modified embodiment of the invention.

Having reference to the drawings in greater detail, the ball valve 10, forming the illustrated embodiment of the invention, comprises a housing 12 cast in two sections 14, 16 which fit together to define an internal valve chamber 18 of generally cylindrical shape. As shown, the housing sections 14, 16 are separately secured together by an arcuate series of stud bolts 20 and define two flow passages 22, 24 opening into opposite ends of the cylindrical chamber 18.

Communication between the passages 22, 24 is controlled by a valve ball 26 defining a central bore 28 which is turned into and out of coaxial alignment with the inner ends of the passages 22, 24 by rotation about an axis generally perpendicular to the axis of the cylindrical chamber 18.

The ball 26 is turned between its open valve and closed valve positions by operating means which allows the ball 26 to "float" in the chamber 18 so that the ball 10 moves under the influence of fluid pressure on the ball toward the inner end of either pasage 22, 24 so as to utilize the force of fluid pressure on the ball to form a seal against the passage of fluid past the ball when it is turned to its closed valve position, as will presently appear.

As shown, the ball 26 defines a slot 30 which receives a flatted operating tang 32, tang 32 being formed on the inner end of a valve operating stem 34 which extends outwardly through a radial bore 36 in a thickened boss 38 that is integral with the housing section 14. The tang 32 is somewhat smaller than the slot 30, thus providing limited play between the ball and tang 32 which allows for "floating" of the ball in the chamber 18.

The operating stem 34 is rotated, in this instance, by a handle 40 nonrotatably connected to the outer end of the stem 34 in a manner which provides for movement of the handle and stem axially relative to each other.

The escape of fluid from the chamber 18 past the stem 34 is effectively prevented by three annular stem seals which comprise an inner seal 42, an outer seal 44, and an intermediate seal 46. The inner seal 42 is fitted around the stem 34 into a counterbore 48 in the inner end of the bore 36 and is forced against the bottom of the counterbore 48 by an annular shoulder 50 on the stem which fits into the counterbore 48. The outer annular seal 44 fits into a counterbore 52 in the outer end of the bore 36 and is pressed against the bottom of the counterbore 52 by a gland 54 slidably encircling the stem 34 inwardly of the handle 40. A jam nut 55 threadedly engages the stem 34 to hold the gland 54 in place, to move the gland 54 inwardly compressing the outer seal 44, and to react through the stem 34 for moving the shoulder 50 outwardly simultaneously compressing the inner seal 42. The intermediate seal 46 is formed by an O-ring fitted into an annular groove 58 in the stem 34 to engage the wall of bore 36. A nut 56 is threaded onto the outer end of stem 34 to hold the handle 40 in place against the travel stop established by an upper shoulder surface 59 of gland 54.

As shown, the housing section 16 is shaped to form a removable cover for the chamber 18. This facilitates finish machining of surfaces of the chamber 18 and provides for convenient assembly and disassembly of the valve. It may be noted that the stem 34 is inserted through the chamber 18 into the bore 36.

Sealing of the ball 26 against the passage of fluid around it when it is turned into the closed valve position is achieved by two annular valve seat assemblies 60 and 62, these assemblies being removably supported in opposite ends of the chamber 18 in encircling relation to the inner ends of the passages 22 and 24. The assemblies 60, 62 are identical in construction and are turned end to end to confront the intervening ball 26.

It will be understood that when the ball 26 is turned to its closed valve position, the force of fluid pressure acts on the ball to urge it toward the inner end of the one of the passages 22, 24 which is under the lower pressure. The seat assemblies 60, 62 are designed to use the cumulative force of fluid pressure on the ball 26 to force the ball into engagement with seats which actively form a seal with the ball and which are so designed that the full cumulative force of fluid pressure on the ball is sustained by seats formed of yieldable materials and having a construction which provides for highly advantageous sealing of the ball, while at the same time protecting the seats themselves from damage by forces transmitted to the seats by the ball, even when the latter is subjected to fluid under high pressure.

Turning to FIG. 3, each seat assembly 60, 62 comprises two ball engaging annular seat rings 64, 66 both of which are formed of yieldable materials. The two seat rings or seats 64, 66 of each seat assembly are supported by an annular seat holder 68 forming a part of the seat assembly and being removably supported in the chamber 18, as will presently appear.

The two seats 64, 66 of each assembly 60, 62 are coaxial and have, with respect to the center of the ball 26, an inboard and outboard relationship to each other, as shown. The inboard seat 64 and the outboard seat 66 of each seat assembly both cooperate to provide the desired seal with the valve ball 26. Yet, the inboard seat and the outboard seat of each assembly are constructed differently so that the two seats serve a cooperative but specifically different function in sustaining and sealing the valve ball. For this reason, one of the seat rings of each assembly, specifically the inboard ring 64, is formed of a yieldable material having a relatively high modulus of elasticity (specifically in compression) and the other seat ring of the assembly, seat ring 66, is formed of a yieldable material having a relatively low modulus of elasticity (specifically in compression).

As examples of two materials which can be used to great advantage in the construction of the two seat rings of each assembly, unfilled polytetrafluoroethylene, sold commercially under the trademark "Teflon," can be used to construct the outboard seat ring 66, and polytetrafluoroethylene incorporating a diffusion of an inert material in pulverous form can be used to form the inboard seat ring 64. Polytetrafluoroethylene incorporating a dispersion of an infusible material is commercially available from the Polymer Corporation, Reading, Pa., under the trademark "Fluorosint." The incorporation of a dispersion of pulverous inert materials, such as pulverous ceramic materials for example, into polytetrafluoroethylene serves to increase markedly the strength characteristics of the material, as compared to plain or unfilled polytetrafluoroethylene. Such materials, sold under the name "Fluorosint" can be obtained having modulus of elasticity in compression and in flexure which are much higher than corresponding properties of plain polytetrafluoroethylene or "Teflon." As a material for construction of the inboard ring 64, "Fluorosint" may be replaced by other materials having a comparatively high modulus of elasticity, comparatively low compression set, and comparatively low cold flow. Such materials as compacted asbestos, metal-encased rubber, crimped metal foil, and molded carbon-graphite compositions are contemplated in this regard.

In the preferred construction illustrated, the inboard and outboard seat rings 64, 66 of each assembly are supported in individual support grooves or retention surfaces 70, 72 formed in the seat holder 68 in adjacent coaxial relation to each other. The inboard groove 70 has a diameter larger than that of the outboard groove 72 and receives the outer periphery of the inboard seat 64 which has an outside diameter larger than that of the outboard seat 66. The inboard seat ring 64 is dimensioned to overlap the outboard seat ring 66 radially and fits in axially abutting relation to an inner radial face 74, on the outboard seat ring. The inboard seat ring 64 is held against axial displacement away from the outboard seat ring 66 by an annular spun lip 76 on the seat holder 68 forming one side of the groove 70.

The inboard seat ring 64 of each seat assembly projects from its seat holder 68 inwardly and laterally in one direction with reference to the seat holder toward the center of the ball 26 to define an annular ball seat surface 78 shaped as an annular segment of a sphere having a radius similar to that of the ball.

The outboard seat ring 66 of each seat assembly is supported at its outer periphery by the seat holder structure defining the groove 72 and by the inboard seat ring 64. The outboard seat ring 66 extends radially inward beyond the inboard ring 64 and projects inwardly and laterally with reference to the coacting holder 68 toward the center of the ball sealing surface 80 which confronts the surface of ball 26. The ball sealing surface 80 has the general shape of an annular segment of a spherical surface having a radius approximately equal to that of the ball.

The inboard and outboard rings 64, 66 are shaped and dimensioned so that, before these seat rings are stressed and displaced by engagement with the coacting ball, the outboard ring 66 projects beyond the inboard ring 64 in the direction of the center of the ball and the sealing surface 80 on the outboard ring has a radial spacing from the position of the center of the ball which is slightly less than the radial spacing of the sealing surface 78 on the inboard seat from the position of the center of the ball. The purpose of this will appear presently.

In the preferred construction illustrated, each outboard seat ring 66 is shaped so that it forms an outer peripheral base 82 of substantial radial thickness which fits snugly between the inboard seat ring 64 and the axially outer side of the coacting seat holder groove 72. Inwardly of the base 82, the seat ring 66 defines a sealing portion 83 having an axially outer face surface 84 which is generally flat before the seat ring is engaged by the ball. Each holder 68 defines an annular support surface 86 confronting the surface 84 of the adjacent outer seat ring 66. The support surface 86 extends radially inward from the seat base 82 in a direction diverging axially away from the initial or unstressed position of the surface 84. Thus, the holder surface 86 and the seat ring surface 84 together define a space 88 into which the sealing portion 83 is bodily deflected by the ball, as will be referred to later in greater detail. Bodily deflection of the sealing portion 83 toward the surface 86 is facilitated by formation of an annular notch 90 in the axially outer face of the ring 66 just inwardly of the ring base 82, notch 90 establishing a medial hinge section 91 which facilitates deflection of the sealing portion 83.

It should be noted that the main body of each outboard seat ring 66, comprising the sealing portion 83, is disposed inwardly of the peripheral base 82. The base 82 has a radial thickness which is only approximately one-fourth the total radial dimension of the outboard ring 66, and the notch 90 extends only approximately one-third of the way through the seat ring in a lateral direction. Thus, while the notch 90 facilitates displacement of the sealing portion 83 toward the support surface 86, it does not deprive the sealing portion 83 from support by the base 82.

The inner periphery of each seat holder 68 defines an annular lip 92 which projects toward the center of the ball 26 from the inner edge of the support surface 86. The lip 92 serves two functions. It forms an annular abutment 94 which lies just inwardly of the adjacent outboard ring 66, when the latter is deflected toward the support surface 86, to prevent extrusion of the ring 66 inwardly along the support surface 86 under the compressive load of the ball. The lip 92 also defines a rigid safety sealing edge 96 confronting the ball in outwardly spaced relation to the ball surface. The spacing of the sealing edge 96 from the ball is such that the ball does not engage the sealing edge 96 except in the event that the adjacent rings 64, 66 are destroyed by some abnormal circumstance such as excessive heat resulting from a factory fire.

A very small, annular sealing bead 98, greatly exaggerated in size for clarity in FIGS. 3 to 5, is formed on the sealing surface 80 of each outboard seat ring 66 to produce, upon initial assembly of the valve, an intensified line of sealing pressure between the outer seat ring and the ball to effect a tight seal on the ball when the valve is first put into service. It is contemplated that bead 98 will wear away in use. Each sealing bead 98 is medially located on the adjacent sealing surface 80 so that a major portion of the sealing portion 83 backs the bead to urge it against the ball.

Returning to FIG. 1, a seal is formed between the seat holder 68 of each assembly 60, 62 and the housing 12 by means of an O-ring 100 which is compressed by an annular protuberance 102 formed on the holder 68. An annular groove 104 cut into the housing 12 receives the O-ring 100.

It will be appreciated that the seat assembly 60, ball 26 and seat assembly 62 are loaded into the chamber 18 before the housing section 16 is assembled with the housing section 14. Before being stressed by engagement with the ball 26, each outboard seat ring 66 occupies the position relative to its holder 68 and its adjacent inboard ring 64 which is illustrated in FIG. 3. The manner in which the outboard ring projects toward the center of the ball beyond the adjacent inboard ring 64 can be visualized with reference to the broken line illustration of a ball in contact with the inboard ring in FIG. 3.

Upon assembly of the valve, the ball 26 deflects the sealing portions of outboard rings 66 somewhat toward their respective support surfaces 86, as illustrated in FIG. 4. The tendency which each of the deflected outboard rings has to seek its initial position causes the ring to produce an effective seal against the ball.

When the ball is turned to its closed valve position it receives the force of fluid pressure which may act on the ball, tending to move the ball toward the one of the passages 22, 24 that is under the lower pressure. Since the ball 26 is free to "float" or move toward the passage under the lower pressure, the full force of differential fluid pressure on the ball tending to move it toward the passage under the lower pressure is transmitted to the yieldable polymeric seat rings 64, 66 at the low pressure side of the valve. Both the inboard and outboard seat rings 64, 66 at the low pressure side of the valve cooperate to sustain the full force of fluid pressure acting on the ball.

The high strength of the inboard seat ring 64 and its high modulus of elasticity enables this seat to sustain the major portion of the load of the ball without substantial deformation, even though the valve may be subjected to high differential fluid pressure. As a consequence, the inboard seat ring 64 at the low pressure side of the valve is resistant to damage and the cooperating outboard seat ring 66 is protected from damage. At the same time, the capacity of the seat rings to sustain the full force of the ball eliminates the necessity for providing additional mechanical restraints on the ball, thus assuring that the ball is tightly and effectively engaged with a seat ring having the capability of forming a tight seal with the ball.

Each outboard ring 66 is formed of yieldable polymeric material having a modulus of elasticity less than that of the adjacent inboard ring whereby to serve a separate function under different operating conditions. When located on the low pressure side of the valve, the outboard ring 66 not only complements the inboard ring in forming an effective seal against high differential pressures on the valve but also serves to advantage in forming an effective seal when the valve is subjected to such lower differential pressures as might not be sufficient to bring the full sealing capabilities of the stronger inboard ring into play. When located on the high pressure side of the valve, the outboard ring 66 serves to maintain an effective seal against the ball, even though the ball is urged against the other seat assembly by fluid pressure. FIGURE 5 illustrates on a somewhat exaggerated scale the action which advantageously occurs at the seat assembly on the high pressure side of the valve when the valve is closed against high pressure. Thus, even though the force of fluid pressure tends to move the ball away from the seat assembly at the high pressure side of the valve, the outboard seat ring tends to seek its initial position, following the ball and maintaining effective sealing engagement with the ball.

It is contemplated that the valve seat rings 64, 66 may over a period of time become permanently deformed somewhat, particularly those seats on the low pressure side of the valve. However, the degree to which the outboard seat 66 of each assembly can be deformed is limited somewhat by progressive engagement with the outboard seat or the support surface 86; and the abutment surface 94 of the annular lip 92 adjacent each outboard seat 66 prevents extrusion of the deflected outboard seat off the support surface 86 whereby to prolong the life of the seat still further.

In the event of a fire or other abnormal conditions causing destruction of one or both of the seat rings 64, 66, the valve ball is moved by fluid pressure into engagement with the rigid sealing surface 96 to form a seal which is effective to block extensive leakage of fluid through the closed valve.

In the event that restoration of the valve seats becomes necessary, this can be readily accomplished by replacing the valve seat assemblies 60, 62.

In order to enhance the understanding of the invention, a modified embodiment thereof is shown in FIG. 6. Since the embodiment of FIG. 6 is similar in certain respects to the embodiment of FIGS. 1–5, like numerals have been used to designate like parts with the suffix letter a being employed to distinguish the elements of the embodiment of FIG. 6.

The ball valve arrangement of FIG. 6 is characterized by the inclusion of a seat structure holder for seat rings 64a and 66a, which seat holder structure is fashioned as an integral part of the valve housing 12a. Thus, the ball valve arrangement of FIG. 6 eliminates the separate seat holder 68 in the embodiment of FIGS. 1–5. The ball valve arrangement of FIG. 6 is also characterized by the absence of a structure corresponding to the spun lip 76 of seat holder 68 in the embodiment of FIGS. 1–5.

The invention is claimed as follows:

1. A ball valve comprising, in combination: a valve housing defining a valve chamber and flow passages opening into said chamber; a flow control ball rotatably disposed within said chamber between said passages; coaxial valve seat rings encircling the inner end of each of said passages, confronting said ball and having with respect to the center of said ball inboard and outboard relationships to each other, said inboard seat ring having inside and outside diameters which are larger than corresponding diameters of the outboard seat ring, said inboard seat ring being formed of a material having a relatively high modulus of elasticity and said outboard seat ring being formed of a material having a relatively low modulus of elasticity, said inboard seat ring being disposed in abutting relation to said outboard ring; support means on said housing providing radial support to said seat rings, said seat rings having ball sealing surfaces confronting said ball; surface means on said support means defining an annular support surface opposing the side of said outboard seat ring generally opposite from said ball to initially define with said outboard ring an annular deflection space providing for limited deflection of said outboard ring away from the center of said ball, said ball being free to transmit to said inboard and outboard rings the full cumulative force acting on the ball; and operating means coacting with said ball to rotate the latter between valve open and valve closed positions.

2. A ball valve comprising, in combination: a valve housing defining a valve chamber and flow passages opening into said chamber; a flow control ball member rotatably disposed within said chamber between said passages; rigid retainer means encircling each of said passages and having generally confronting, relatively inboard and outboard retention surfaces, coaxial valve seat rings encircling each of said passages retained by said retainer means, confronting said member and having with respect to the center of said member inboard and outboard relationships to each other, said inboard seat ring being formed of a material having a relatively high modulus of elasticity and said outboard seat ring being formed of a material having a relatively low modulus of elasticity, said outboard ring having a lesser diameter than said inboard ring whereby to establish said relative inboard-outboard relationship; said outboard seat ring engaging at least a portion of the outboard retention surface and said inboard seat ring engaging said outboard seat ring and at least a portion of the inboard retention surface, said retainer means providing radial support to said seat rings, said seat rings defining sealing surfaces confronting said flow control member, said member being free to transmit to said inboard and outboard rings the full cumulative force acting on the member; and operating means coacting with said member to rotate the latter between open valve and closed valve positions.

3. A ball valve according to claim 2 wherein said seat rings are formed of yieldable polymeric material.

4. A ball valve according to claim 3 wherein said polymeric material is polytetrafluoroethylene.

5. A ball valve according to claim 4 wherein the polytetrafluoroethylene of said inboard ring has an inert, particulate material dispersed therein.

6. A ball valve according to claim 2 wherein said support means comprises seat holder elements removably mounted in said valve housing.

7. A ball valve comprising: a valve housing defining a valve chamber and flow passages opening into said chamber; a flow control member rotatably disposed in said chamber between said passages; coaxial valve seat rings encircling each of said passages, confronting said member and having with respect to the center of said member inboard and outboard relationships to each other, said inboard seat ring and said outboard seat ring being formed of yieldable polymeric material, said outboard ring being provided with a medial notch to promote flexing of that portion thereof which is disposed radially inwardly of said notch; support means on said housing providing radial support to said seat rings, said seat rings defining said sealing surfaces confronting said flow control member and said member being free to transmit to said inboard and outboard rings the full cumulative force acting on the member; and operating means coacting with said member to rotate the same between said open valve and closed valve positions.

8. For use in a ball valve, a seat assembly comprising, in combination: an annular valve seat holder adapted to be removably disposed in a valve chamber and having inboard and outboard retention surfaces, two coaxial valve seat rings supported by said holder and projecting therefrom to define annular ball seating surfaces spaced from the holder with the outboard seat ring engaging at least a portion of said outboard retention surface and with the inboard seat ring engaging the outboard seat ring and at least a portion of said inboard retention surface whereby to provide radial support to said seat rings, the relatively outboard one of said rings being formed of a material having a relatively low modulus of elasticity and the relatively inboard one of said rings being formed of a material having a relatively high modulus of elasticity, said outboard ring having a lesser diameter than said inboard ring whereby to establish said relative inboard-outboard relationship.

9. A ball valve comprising, in combination: a valve housing defining a valve chamber and flow passages opening into said chamber; a flow control member rotatably disposed within said chamber between said passages; coaxial valve seat rings encircling each of said passages, confronting said member and having with respect to the center of said member inboard and outboard relationships to each other, said inboard seat ring being formed of a material having a relatively high modulus of elasticity and said outboard seat ring being formed of a material having a relatively low modulus of elasticity and provided with a medial notch to promote flexing of that portion of the ring which is disposed radially inwardly of said notch; support means on said housing providing radial support to said seat rings, said seat rings defining sealing surfaces confronting said flow control member, said member being free to transmit to said inboard and outboard rings the full cumulative force acting on the member; and operating means coacting with said member to rotate the latter between open valve and closed valve positions.

10. A ball valve according to claim 9 wherein said support means includes a surface spaced apart from said outboard ring radially outwardly of said flow control member to define a space into which the flexing portion of said outboard ring may be deflected.

References Cited

UNITED STATES PATENTS

| | | | |
|---|---|---|---|
| 3,150,681 | 9/1964 | Hansen et al. | 251—315 X |
| 3,164,169 | 1/1965 | Pareto | 251—315 X |
| 2,861,773 | 11/1958 | Clade | 251—315 |
| 3,009,680 | 11/1961 | Kaiser | 251—315 |
| 3,030,068 | 4/1962 | Priese | 251—317 X |
| 3,331,582 | 7/1967 | Ford | 251—317 |
| 3,346,233 | 10/1967 | Billson | 251—172 |

HENRY T. KLINKSIEK, Primary Examiner

MICHAEL O. STURM, Assistant Examiner

U.S. Cl. X.R.

251—317